US008268480B1

(12) United States Patent
Winter

(10) Patent No.: US 8,268,480 B1
(45) Date of Patent: Sep. 18, 2012

(54) ELECTROCHEMICAL ENERGY SYSTEM

(75) Inventor: Rick Winter, Orinda, CA (US)

(73) Assignee: Primus Power Corporation, Hayward, CA (US)

( * ) Notice: Subject to any disclaimer, the term of this patent is extended or adjusted under 35 U.S.C. 154(b) by 0 days.

(21) Appl. No.: 13/540,892

(22) Filed: Jul. 3, 2012

Related U.S. Application Data

(63) Continuation of application No. 13/357,270, filed on Jan. 24, 2012, now Pat. No. 8,236,445, which is a continuation of application No. 12/458,853, filed on Jul. 24, 2009, now Pat. No. 8,114,541, which is a continuation-in-part of application No. 12/523,146, filed as application No. PCT/US2008/051111 on Jan. 16, 2008, now Pat. No. 8,039,161, which is a continuation of application No. 11/654,380, filed on Jan. 16, 2007, now abandoned.

(51) Int. Cl.
H01M 8/04 (2006.01)

(52) U.S. Cl. ........ 429/199; 429/101; 429/105; 429/163; 429/207; 429/229

(58) Field of Classification Search .................. 429/101, 429/105, 163, 199, 207, 229
See application file for complete search history.

(56) References Cited

U.S. PATENT DOCUMENTS

| 3,540,934 A | 11/1970 | Boeke |
| 3,644,190 A | 2/1972 | Weist et al. |
| 3,713,888 A | 1/1973 | Symons |
| 3,773,561 A | 11/1973 | Bjorkman |
| 3,813,301 A | 5/1974 | Carr |
| 3,909,298 A | 9/1975 | Carr |
| 3,935,024 A | 1/1976 | Symons |
| 3,940,283 A | 2/1976 | Symons |
| 3,954,502 A | 5/1976 | Symons et al. |
| 3,993,502 A | 11/1976 | Bjorkman, Jr. |
| 4,001,036 A | 1/1977 | Berman et al. |
| 4,020,238 A | 4/1977 | Symons |
| 4,025,697 A | 5/1977 | Hart |

(Continued)

FOREIGN PATENT DOCUMENTS

JP 63-314782 A 12/1988

(Continued)

OTHER PUBLICATIONS

Symons, Philip C., "Advanced Technology Zinc/Chlorine Batteries for Electric Utility Load Leveling," 19th Intersociety Energy Conversion Engineering Conf., 1984, vol. 2, 857-862.

(Continued)

*Primary Examiner* — Patrick Ryan
*Assistant Examiner* — Ben Lewis
(74) *Attorney, Agent, or Firm* — The Marbury Law Group PLLC

(57) ABSTRACT

An electrochemical energy generation system can include a sealed vessel that contains inside (i) at least one electrochemical cell, which has two electrodes and a reaction zone between them; (ii) a liquefied halogen reactant, such as a liquefied molecular chlorine; (iii) at least one metal halide electrolyte; and (iv) a flow circuit that can be used for delivering the halogen reactant and the electrolyte to the at least one cell. The sealed vessel can maintain an inside pressure above a liquefication pressure for the halogen reactant. Also disclosed are methods of using and methods of making for electrochemical energy generation systems.

8 Claims, 6 Drawing Sheets

U.S. PATENT DOCUMENTS

| | | | |
|---|---|---|---|
| 4,068,043 A | 1/1978 | Carr | |
| 4,071,660 A | 1/1978 | Hart | |
| 4,072,540 A | 2/1978 | Symons et al. | |
| 4,086,393 A | 4/1978 | Hart | |
| 4,100,332 A | 7/1978 | Carr | |
| 4,115,529 A | 9/1978 | Behling | |
| 4,127,701 A | 11/1978 | Symons et al. | |
| 4,146,680 A | 3/1979 | Carr et al. | |
| 4,162,351 A | 7/1979 | Putt et al. | |
| 4,200,684 A | 4/1980 | Bro | |
| 4,257,867 A | 3/1981 | Hammond et al. | |
| 4,273,839 A | 6/1981 | Carr et al. | |
| 4,287,267 A | 9/1981 | Whittlesey et al. | |
| 4,306,003 A | 12/1981 | Henriksen | |
| 4,307,159 A | 12/1981 | Hammond et al. | |
| 4,320,179 A | 3/1982 | Hart | |
| 4,371,825 A | 2/1983 | Chi et al. | |
| 4,413,042 A | 11/1983 | Carr | |
| 4,414,292 A | 11/1983 | Kiwalle et al. | |
| 4,415,847 A | 11/1983 | Galloway | |
| 4,518,663 A | 5/1985 | Kodali et al. | |
| 4,518,664 A | 5/1985 | Whittlesey et al. | |
| 4,534,833 A | 8/1985 | Carr et al. | |
| 4,567,120 A | 1/1986 | Jorne et al. | |
| 4,678,656 A | 7/1987 | Bjorkman, Jr. et al. | |
| 4,728,587 A | 3/1988 | Horie et al. | |
| 4,746,585 A | 5/1988 | Stoner et al. | |
| 4,784,924 A * | 11/1988 | Savinell et al. | 429/109 |
| 2004/0234843 A1 | 11/2004 | Skyllas-Kazacos | |
| 2005/0181273 A1 | 8/2005 | Deguchi et al. | |
| 2005/0244707 A1 | 11/2005 | Skyllas-Kazacos et al. | |
| 2009/0239131 A1 | 9/2009 | Winter | |
| 2010/0009243 A1 | 1/2010 | Winter | |
| 2011/0200853 A1 | 8/2011 | Winter | |

FOREIGN PATENT DOCUMENTS

| | | |
|---|---|---|
| JP | 02-010671 A | 1/1990 |
| WO | WO 2008/089205 A2 | 7/2008 |

OTHER PUBLICATIONS

International Search Report mailed Jul. 8, 2008, in PCT/US2008/051111 (WO 2008/089205), 2 pages.

EPRI Report, EM-1051 (parts 1-3), Apr. 1979, Electric Power Research Institute.

* cited by examiner

ELECTROCHEMICAL ENERGY SYSTEM

CROSS-REFERENCE TO RELATED PATENT APPLICATIONS

The present application is a continuation of U.S. patent application Ser. No. 13/357,270, filed Jan. 24, 2012, which is a continuation of U.S. patent application Ser. No. 12/458,853, filed Jul. 24, 2009, now U.S. Pat. No. 8,114,541, issued Feb. 14, 2012, which is a continuation-in-part of U.S. patent application Ser. No. 12/523,146, filed Jul. 14, 2009, now U.S. Pat. No. 8,039,161, issued Oct. 18, 2011, which is a U.S. National Phase entry of PCT application no. PCT/US2008/051111 filed Jan. 16, 2008, which is a continuation of U.S. patent application Ser. No. 11/654,380 filed Jan. 16, 2007, all of which are incorporated herein by reference in their entirety.

FIELD

The present inventions generally relate to electrochemical energy generation systems and methods. And more particularly to metal halide electrochemical energy systems and methods of making and using such systems.

SUMMARY

In one embodiment, an electrochemical energy generation system comprises a pressurized sealed vessel that contains (a) at least one cell that comprises a first electrode; a second electrode; and a reaction zone between the first and second electrodes; (b) a liquefied halogen reactant; (c) at least one metal halide electrolyte; and (d) a flow circuit configured to deliver the halogen reactant and the at least one electrolyte to the at least one cell, wherein a pressure in an inner volume of the vessel is above a liquefication pressure for the halogen reactant and wherein the reaction zone of the cell does not contain a membrane or a separator that is impermeable to the halogen reactant.

In another embodiment, an electrochemical energy generation system comprises a sealed vessel that contains (a) at least one cell that comprises: a first electrode; a second electrode; and a reaction zone between the first and second electrodes; (b) a liquid chlorine reactant; (c) at least one metal-chloride electrolyte; and (d) a closed loop flow circuit configured to deliver the chlorine reactant and the at least one metal-chloride electrolyte to and from the reaction zone, wherein the chlorine reactant and the metal halide reactant have the same flow path in the loop circuit in the at least one cell.

Yet in another embodiment, a metal halogen electrochemical energy generation system, comprises (A) a pressure containment vessel that contains (a) a vertical stack of horizontally positioned cells, wherein each cell of the stack comprises at least one positive electrode; at least one negative electrode; and a reaction zone between the positive electrode and the negative electrode; and (b) an electrolyte mixture comprising (i) at least one aqueous electrolyte comprising a metal and a halogen and (ii) a pressurized halogen reactant; and (B) a circulation pump that is configured to convey a flow of the electrolyte mixture through the reaction zone so that the halogen reactant is reduced at the positive electrode to form a halogen ion rich electrolyte mixture, which passes by the negative electrode.

Yet in another embodiment, an electrochemical energy generation system comprises a pressurized sealed vessel that has an inner volume that comprises a first pressure zone and a second pressure zone that surrounds the first pressure zone, wherein 1) the first pressure zone contains: (a) at least one cell that comprises: a first electrode; a second electrode; and a reaction zone between the first and second electrodes; (b) a liquefied halogen reactant; (c) at least one metal halide electrolyte; and (d) a flow circuit configured to deliver the halogen reactant and the at least one electrolyte to the at least one cell; and 2) a pressure in the first pressure zone is above a liquefication pressure for the halogen reactant, while a pressure in the second pressure zone is above the pressure in the first pressure zone.

DETAILED DESCRIPTION

Disclosure

The embodiments of the present invention relate to an electrochemical system (also sometimes referred to as a "flow battery") that utilizes a metal-halide electrolyte and a halogen reactant, such as molecular chlorine. The halide in the metal halide electrolyte and the halogen reactant can be of the same type in such systems. For example, when the halogen reactant is molecular chlorine, the metal halide electrolyte can contain at least one metal chloride.

The electrochemical energy generation system can include a sealed vessel, such as a pressure vessel, that can contain in its inner volume at least one electrochemical cell, at least one metal halide electrolyte and a halogen reactant, such as a molecular chlorine reactant, and a flow circuit that is configured to deliver the metal halide electrolyte and the halogen reactant to the electrochemical cell(s).

Figure 4:
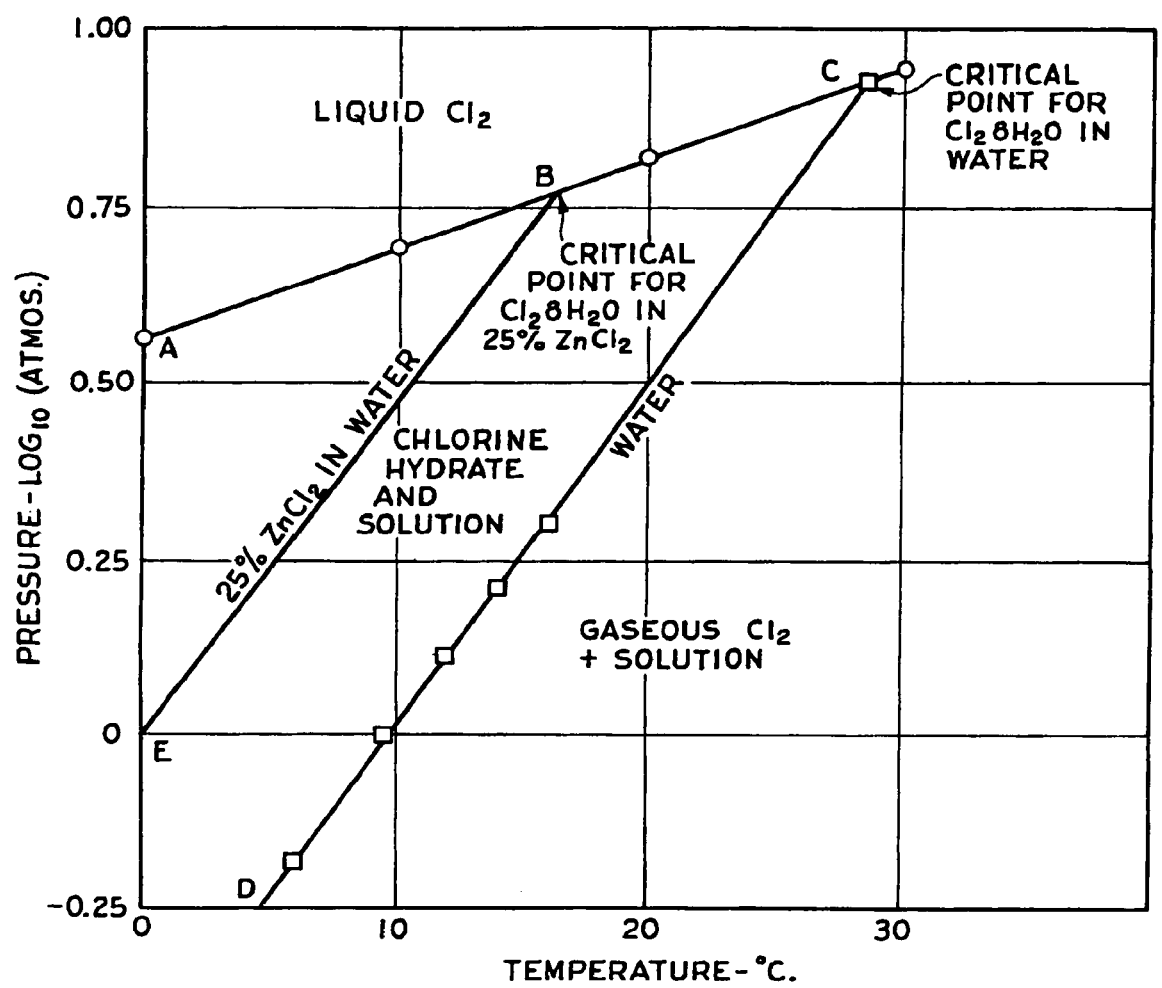
FIG. 4 is a prior art phase diagram for a molecular chlorine as presented in U.S. Pat. No. 3,940,283.

In many embodiments, the halogen reactant may be used in a liquefied form and the sealed vessel is such that it can maintain an inside pressure above a liquefication pressure for the halogen reactant at a given ambient temperature. A liquefication pressure for a particular halogen reactant for a given temperature may be determined from a phase diagram for the halogen reactant. For example, FIG. 4 presents a phase diagram for elemental chlorine, from which a liquefication pressure for a given temperature may be determined. The system that utilizes the liquefied halogen reactant in the sealed container does not require a compressor, which can be used in other electrochemical systems for compression of gaseous halogen reactants. The system that utilizes the liquefied halogen reactant does not require a separate storage for the halogen reactant, which is located outside the inner volume of the sealed vessel. The term "liquefied halogen reactant" refers to at least one of molecular halogen dissolved in water, which is also known as wet halogen or aqueous halogen, and "dry" liquid molecular halogen, which is not dissolved in water. Similarly, the term "liquefied chlorine" may refer to at least one of molecular chlorine dissolved in water, which is also known as wet chlorine or aqueous chlorine, and "dry" liquid chlorine, which is not dissolved in water.

In many embodiments, the system utilizes a liquefied molecular chlorine as a halogen reactant. The liquefied molecular chlorine has a gravity which is approximately two times greater than that of water.

The flow circuit contained in the sealed container may be a closed loop circuit that is configured to deliver the halogen reactant, preferably in the liquefied or liquid state, and the at least one electrolyte to and from the cell(s). In many embodiments, the loop circuit may be a sealed loop circuit. Although the components, such as the halogen reactant and the metal halide electrolyte, circulated through the closed loop are preferably in a liquefied state, the closed loop may contain inside a certain amount gas, such as chlorine gas.

Preferably, the loop circuit is such that the metal halide electrolyte and the halogen reactant circulate through the same flow path without a separation in the cell(s).

Each of the electrochemical cell(s) may comprise a first electrode, which may serve as a positive electrode in a normal discharge mode, and a second electrode, which may serve as a negative electrode in a normal discharge mode, and a reaction zone between the electrodes. In many embodiments, the reaction zone may be such that no separation of the halogen reactant, such as the halogen reactant or ionized halogen reactant dissolved in water of the electrolyte solution, occurs in the reaction zone. For example, when the halogen reactant is a liquefied chlorine reactant, the reaction zone can be such that no separation of the chlorine reactant, such as the chlorine reactant or chlorine ions dissolved in water of the electrolyte solution, occurs in the reaction zone. The reaction zone may be such that it does not contain a membrane or a separator between the positive and negative electrodes of the same cell that is impermeable to the halogen reactant, such as the halogen reactant or ionized halogen reactant dissolved in water of the electrolyte solution. For example, the reaction zone may be such that it does not contain a membrane or a separator between the positive and negative electrodes of the same cell that is impermeable to the liquefied chlorine reactant, such as the chlorine reactant or chlorine ions dissolved in water of the electrolyte solution.

In many embodiments, the reaction zone may be such that no separation of halogen ions, such as halogen ions formed by reducing the halogen reactant at one of the electrodes, from the rest of the flow occurs in the reaction zone. In other words, the reaction zone may be such that it does not contain a membrane or a separator between the positive and negative electrodes of the same cell that is impermeable for the halogen ions, such as chlorine ions. In certain embodiments, the first electrode may be a porous electrode or contain at least one porous element. For example, the first electrode may comprise a porous carbonaceous material such as a porous carbon foam. In a discharge mode, the first electrode may serve as a positive electrode, at which the halogen may be reduced into halogen ions. The use of the porous material in the first electrode may increase efficiency of the halogen reactant's reduction.

In many embodiments, the second electrode may comprise an oxidizable metal, i.e., a metal that may be oxidized to form cations during the discharge mode. In many embodiments, the second electrode may comprise a metal, that is of the same type as a metal ion in one of the components of the metal halide electrolyte. For example, when the metal halide electrolyte comprises zinc halide, such as zinc chloride, the second electrode may comprise metallic zinc. In such a case, the electrochemical system may function as a reversible system.

Thus, in some embodiments, the electrochemical system may be reversible, i.e. capable of working in both charge and discharge operation mode; or non-reversible, i.e. capable of working only in a discharge operation mode. The reversible electrochemical system usually utilizes at least one metal halide in the electrolyte, such that the metal of the metal halide is sufficiently strong and stable in its reduced form to be able to form an electrode. The metal halides that can be used in the reversible system include zinc halides, as element zinc is sufficiently stable to be able to form an electrode. On the other hand, the non-reversible electrochemical energy generation system does not utilize the metal halides that satisfy the above requirements. Metals of metal halides that are used in the non-reversible systems are usually unstable and strong in their reduced, elemental form to be able to form an electrode. Examples of such unstable metals and their corresponding metal halides include potassium (K) and potassium halides and sodium (Na) and sodium halides.

The metal halide electrolyte can be an aqueous electrolytic solution. The electrolyte may be an aqueous solution of at least one metal halide electrolyte compound, such as ZnCl. For example, the solution may be a 15-50% aqueous solution of ZnCl, such as 25% % solution of ZnCl. In certain embodiments, the electrolyte may contain one or more additives, which can enhance the electrical conductivity of the electrolytic solution. For example, when the electrolyte contains ZnCl, such additive can be one or more salts of sodium or potassium, such as NaCl or KCl.

Figure 1:
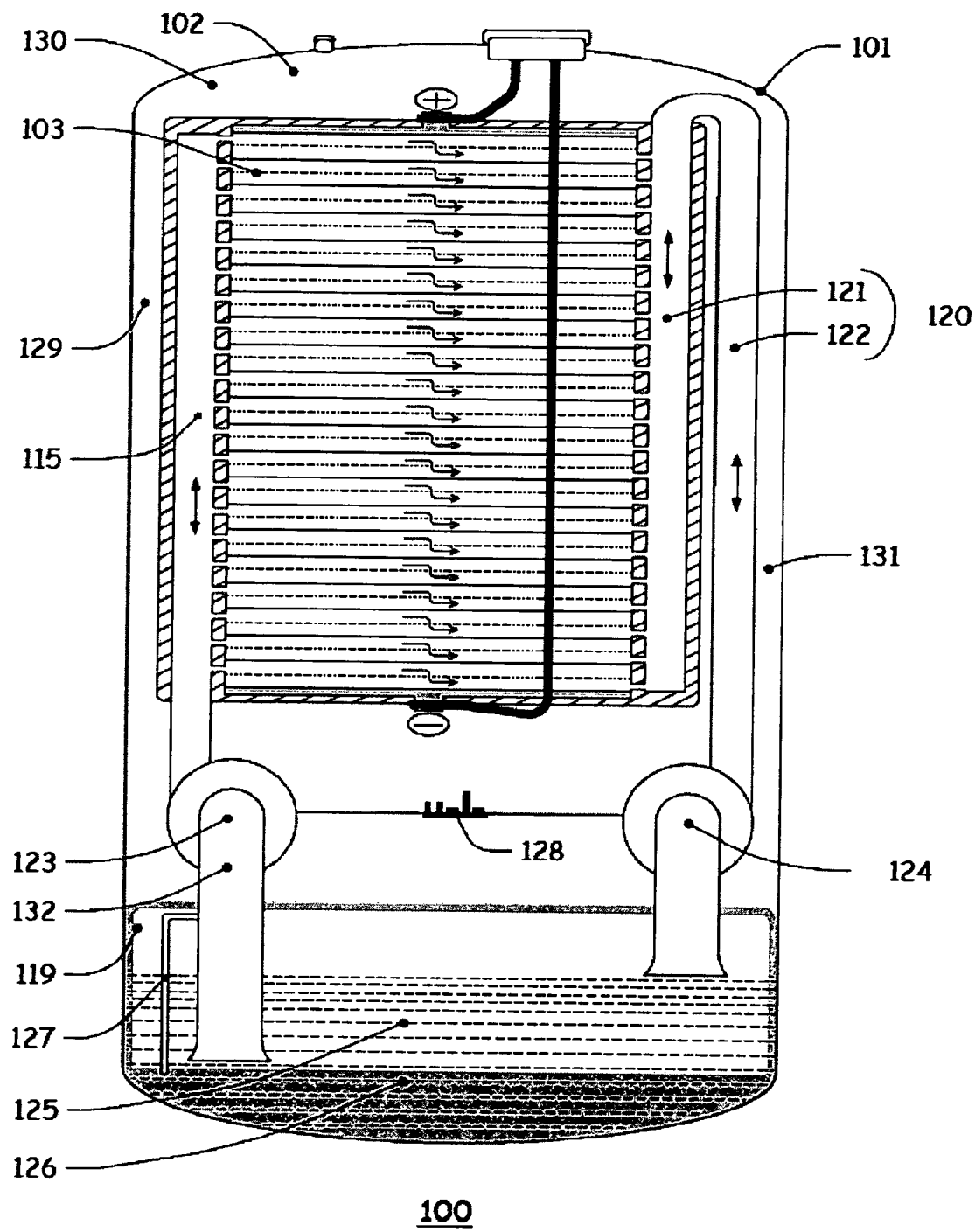
FIG. 1 illustrates a side cross section view of an embodiment of the electrochemical energy generation system with a sealed container containing a stack of electrochemical cells.

FIG. 1 illustrates an electrochemical energy generation system 100 which includes at least one electrochemical cell, an electrolyte and a halogen reactant contained in a sealed container 101. The sealed container 101 is preferably a pressure containment vessel, which is configured to maintain a pressure above one atmosphere in its inner volume 102. Preferably, the sealed container 101 is configured to maintain a pressure in its inner volume above the liquefication pressure for the halogen reactant, such as elemental chlorine. For functioning at a normal temperature such as 10-40 C, the sealed container may be configured to maintain an inside pressure of at least 75 psi or of at least 100 psi or of at least 125 psi or of at least 150 psi or of at least 175 psi or of at least 200 psi or of at least 250 psi or of at least 300 psi or of at least 350 psi or of at least 400 psi or of at least 450 psi or of at least 500 psi or of at least 550 psi or of at least 600 psi, such as 75-650 psi or 75-400 psi and all subranges described previously. The walls of the sealed container may be composed of a structural material capable to withstand the required pressure. One non-limiting example of such material is stainless steel.

The at least one electrochemical cell contained inside the sealed container 101 is preferably a horizontally positioned cell, which may include a horizontal positive electrode and horizontal negative electrode separated by a gap. The horizontally positioned cell may be advantageous because when the circulation of the metal halide electrolyte and the halogen reagent stops due to, for example, turning off a discharge or a charge pump, some amount of liquid (the electrolyte and/or the halogen reactant) may remain in the reaction zone of the cell. The amount of the liquid may be such that it provides electrical contact between the positive and negative electrodes of the same cell. The presence of the liquid in the reaction zone may allow a faster restart of the electrochemical system when the circulation of the metal halide electrolyte and the halogen reagent is restored compared to systems that utilize a vertically positioned cell(s), while providing for shunt interruption. The presence of the electrolyte in the reaction zone may allow for the cell to hold a charge in the absence of the circulation and thus, ensure that the system provides uninterrupted power supply (UPS). The horizontally positioned cell(s) in a combination with a liquefied chlorine reactant used as a halogen reactant may also prevent or reduce a formation of chlorine bubbles during the operation.

In many embodiments, the sealed container may contain more than one electrochemical cell. In certain embodiments, the sealed container may contain a plurality of electrochemical cells, which may be connected in series. In some embodiments, the plurality of electrochemical cells that are connected in series may be arranged in a stack. For example, element 103 in FIG. 1 represents a vertical stack of horizontally positioned electrochemical cells, which are connected in series. The stack of horizontally positioned cells may be similar to the one disclosed on pages 7-11 and FIGS. 1-3 of WO2008/089205, which is incorporated herein by reference in its entirety. The advantages of a single horizontally positioned cell apply to the stack as well.

The electrochemical energy generation system can include a feed pipe or manifold that may be configured in a normal discharge operation mode to deliver a mixture comprising the metal-halide electrolyte and the liquefied halogen reactant to the at least one cell. The electrochemical energy generation system may also include a return pipe or manifold that may be configured in the discharge mode to collect products of an electrochemical reaction from the at least one electrochemical cell. Such products may be a mixture comprising the metal-halide electrolyte and/or the liquefied halogen reactant, although the concentration of the halogen reactant in the mixture may be reduced compared to the mixture entering the cell due to the consumption of the halogen reactant in the discharge mode.

For example, in FIG. 1 a feed pipe or manifold 115 is configured to deliver a mixture comprising the metal-halide electrolyte and the liquefied halogen reactant to the horizontally positioned cells of the stack 103. A return pipe or manifold 120 is configured to collect products of an electrochemical reaction from cells of the stack. As will be further discussed, in some embodiments, the feed pipe or manifold and/or the return pipe or manifold may be a part of a stack assembly for the stack of the horizontally positioned cells. In some embodiments, the stack 103 may be supported directly by walls of the vessel 101. Yet in some embodiments, the stack 103 may supported by one or more pipes, pillars or strings connected to walls of the vessel 101 and/or reservoir 119.

The feed pipe or manifold and the return pipe or manifold may be connected to a reservoir 119 that may contain the liquefied, e.g. liquid, halogen reactant and/or the metal halide reactant. Such a reservoir may be located within the sealed container 101. The reservoir, the feed pipe or manifold, the return pipe or manifold and the at least one cell may form a loop circuit for circulating the metal-halide electrolyte and the liquefied halogen reactant.

The metal-halide electrolyte and the liquefied halogen reactant may flow through the loop circuit in opposite directions in charge and discharge modes. In the discharge mode, the feed pipe or manifold 115 may be used for delivering the metal-halide electrolyte and the liquefied halogen reactant to the at least one cell 103 from the reservoir 119 and the return pipe or manifold 120 for delivering the metal-halide electrolyte and the liquefied halogen reactant from the at least one cell back to the reservoir. In the charge mode, the return pipe or manifold 120 may be used for delivering the metal-halide electrolyte and/or the liquefied halogen reactant to the at least one cell 103 from the reservoir 119 and the feed pipe or manifold 115 for delivering the metal-halide electrolyte and/or the liquefied halogen reactant from the at least one cell 103 back to the reservoir 119.

In some embodiments, when the system utilizes a vertical stack of horizontally positioned cells, the return pipe or manifold 120 may be an upward-flowing return pipe or manifold. The pipe 120 includes an upward running section 121 and a downward running section 122. The flow of the metal-halide electrolyte and the liquefied halogen electrolyte leaves the cells of the stack 103 in the discharge mode upward through the section 121 and then goes downward to the reservoir through the section 122. The upward flowing return pipe or manifold may prevent the flow from going mostly through the bottom cell of the stack 103, thereby, providing a more uniform flow path resistance between the cells of the stack.

The electrochemical energy generation system may include one or more pumps for pumping the metal-halide electrolyte and the liquefied halogen reactant. Such a pump may or may not be located within the inner volume of the sealed vessel. For example, FIG. 1 shows discharge pump 123, which fluidly connects the reservoir 119 and the feed pipe or manifold 115 and which is configured to deliver the metal-halide electrolyte and the liquefied halogen reactant through the feed pipe or manifold 115 to the electrochemical cell(s) 103 in the discharge mode. In some embodiments, the electrochemical generation system may include charge pump depicted as element 124 in FIG. 1. The charge pump fluidly connects the return pipe or manifold 120 to the reservoir 119 and can be used to deliver the metal-halide electrolyte and the liquefied halogen reactant through the return pipe or manifold to the electrochemical cell(s) in the charge mode. In some embodiments, the electrochemical system may include both charge and discharge pumps. The charge and discharge pumps may be configured to pump the metal-halide electrolyte and the liquefied halogen reactant in the opposite directions through the loop circuit that includes the feed pipe or manifold and the return pump or manifold. Preferably, the charge and discharge pumps are configured in such a way so that only one pump operates at a given time. Such an arrangement may improve the reliability of the system and increase the lifetime of the system. The opposite pump arrangement may also allow one not to use in the system a valve for switching between the charge and discharge modes. Such a switch valve may often cost more than an additional pump. Thus, the opposite pump arrangement may reduce the overall cost of the system.

Pumps that are used in the system may be centripetal pumps. In some embodiments, it may be preferred to use a pump that is capable to provide a pumping rate of at least 30 L/min FIG. 1 depicts the reservoir for the liquefied halogen reactant as element 119. The reservoir may be made of a material, which is inert to the halogen reactant. One non-limiting example of such inert material may be a polymer material, such as polyvinyl chloride (PVC). The reservoir may also store the metal halide electrolyte. In such a case, if the liquefied chlorine used as a liquefied halogen reactant, then the chlorine will be separated from the metal halide electrolyte due to a higher density (specific gravity) of the former. FIG. 1 shows liquefied chlorine at the lower part of the reservoir (element 126) and the metal-halide electrolyte being above the liquefied chlorine in the reservoir (element 125).

The reservoir 119 may contain a feed line for the liquefied halogen reactant, which may supply the halogen reactant 126 to the feed pipe or manifold 115 of the system. A connection between the halogen reactant feed line and the feed manifold of the system may occur before, at or after a discharge pump 123. In some embodiments, the connection between the halogen reactant feed line and the feed manifold of the system may comprise a mixing venturi. FIG. 1 presents the feed line for the liquefied halogen reactant as element 127. An inlet of the feed line 127, such as a pipe or conduit, may extend to the lower part 126 of the reservoir 119, where the liquefied halogen reactant, such as the liquefied chlorine reactant, may be stored. An outlet of the feed line 127 is connected to an inlet of the discharge pump 123. The electrolyte intake feed line, such as a pipe or conduit 132, may extend to the upper part 125, where the metal-halide electrolyte is located.

In some embodiments, the reservoir 119 may include one or more sump plates, which may be, for example, a horizontal plate with holes in it. The sump plate may facilitate the settling down of the liquefied halogen reactant, such as liquefied chlorine reactant, at the lower part 126 of the reservoir, when the liquefied halogen reactant returns to the reservoir 119, for example, from the return pipe or manifold 120 in the discharge mode. The reservoir 119 is preferably but not necessarily located below the stack of cells 103.

In some embodiments, the reservoir 119 may include one or more baffle plates. Such baffle plates may be vertical plates located at the top and bottom of the reservoir. The baffle plates may reduce and/or prevent eddy currents in the returning flow of the metal-halide electrolyte and the liquefied halogen reactant, thereby enhancing the separation of the liquefied halogen from the metal-halide electrolyte in the reservoir.

In certain embodiments, the discharge pump may be positioned with respect to the reservoir so that it's inlet/outlet is located below the upper level of the metal-halide electrolyte in the reservoir. In certain embodiments, the inlet/outlet of the discharge pump may be positioned horizontally or essentially horizontally. In such an arrangement, the flow of the metal-halide electrolyte and the liquefied halogen reactant may make a 90 degree turn in the discharge pump from a horizontal direction in the inlet to a vertical direction in the feed manifold or pipe 115. In some embodiments, the inlet of the discharge pump 123 may include a bellmouth piece, which may slow down the flow and thereby prevent/reduce formation of turbulence in the reservoir.

The charge pump may also be positioned with it's inlet/outlet located below the upper level of the metal-halide electrolyte in the reservoir. In certain embodiments, the inlet/outlet of the charge pump may be located at a lower level than the inlet/outlet of the discharge pump. The inlet/outlet of the charge pump may also have a bellmouth piece, which may slow down the flow and thereby prevent/reduce formation of turbulence in the reservoir.

Figure 6:
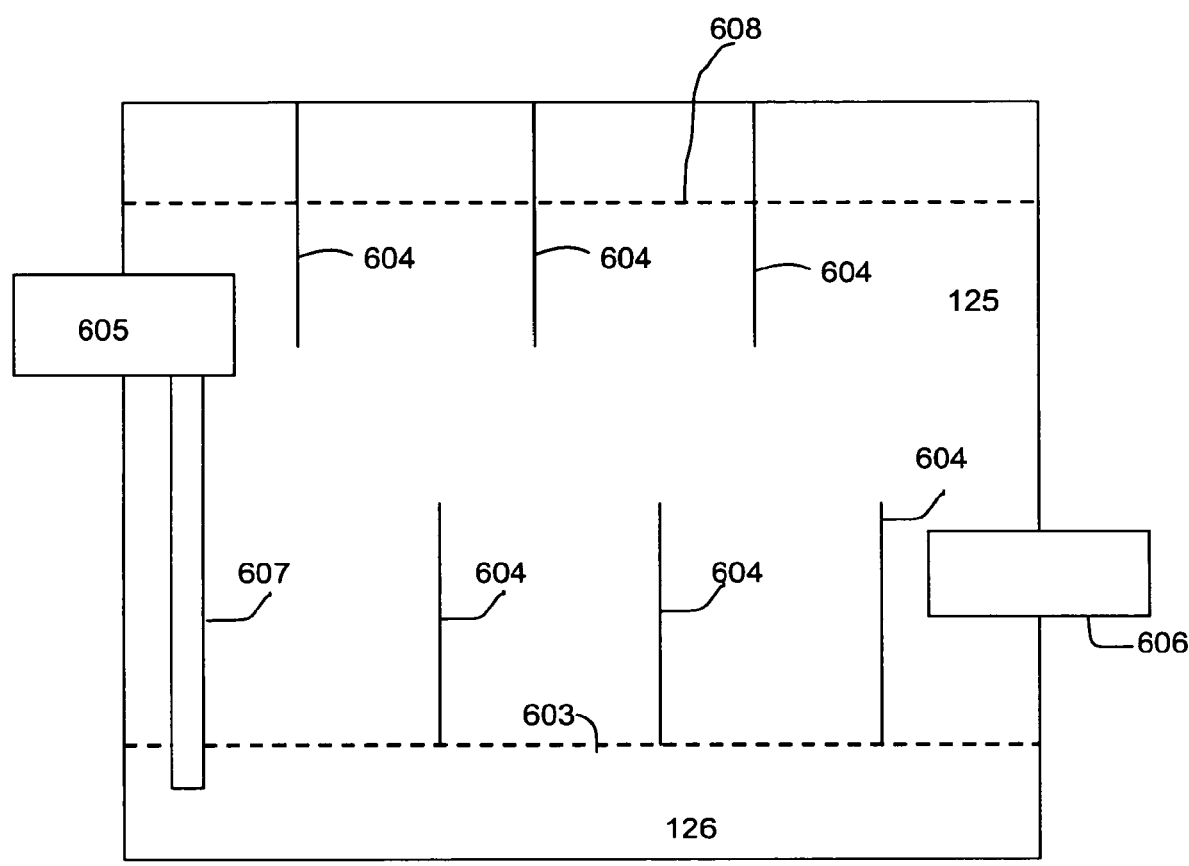
FIG. 6 schematically illustrates a side cross section view of a reservoir which has a sump plate and baffle plates.

FIG. 6 illustrates the reservoir 119 which has a lower part 126, which may contain the liquefied halogen reactant, such as a liquefied molecular chlorine reactant; an upper part 125, which may contain the metal halide reactant; a horizontal sump plate 603, vertical baffle plates 604, a horizontal inlet of a discharge pump 605, a horizontal outlet of a charge pump 606 and a feed line for the liquefied halogen reactant 607, which has an inlet in the lower part 126 of the reservoir and which is connected to the discharge pump's inlet 605. The sump plate 603 is positioned approximately at the level where the boundary between the metal-halide electrolyte and the halogen reactant is expected to be located. Line 608 schematically depicts the upper level of the metal-halide electrolyte in the reservoir. Discharge pump's inlet 605 and charge pump's outlet may protrude through the walls of the reservoir.

In some embodiments, the electrochemical system may include a controlling element, which may be used, for example, for controlling a rate of the discharge pump, a rate of the charge pump and/or a rate of feeding the halogen reactant into the electrolyte. Such a controlling element may be an analog circuit. FIG. 1 depicts the controlling element as element 128, which may control one or more of the following parameters: rates of the charge pump 124 and the discharge pump 123 and a feed rate of the liquefied chlorine reagent through the chlorine feed line 127.

The inner volume of the sealed container may have several pressurized zones, each having a different pressure. For example, the inner volume may include a first zone and a second zone, which has a pressure higher than that of the first zone. In some embodiments, the first zone may be enveloped or surrounded by the second, higher pressure zone. The first zone may contain the electrolyte/liquefied halogen reactant loop, i.e. the reservoir 119, the cell(s) 103, pump(s) 123 and 124, manifold(s) 115, 120, while the second surrounding or enveloping zone may be a space between the first zone and the walls of the sealed vessel 101. In FIG. 1, the cells 103, the feed manifold or pipe 115, the reservoir 119, including the metal halide reactant in the upper part 125 of the reservoir and the liquefied halogen reactant in its lower part 126, and the return manifold or pipe 120 all may be in the first pressure zone, while the higher pressure second zone may be represented by the areas 129, 130 and 131 of the inner volume of the vessel 101.

In such an arrangement, a pressure in the first zone may be a pressure sufficient to liquefy the halogen reactant at a given temperature. Such a pressure may be at least 75 psi or at least 100 psi or at least 125 psi or at least 150 psi or at least 175 psi or at least 200 psi or at least 250 psi or at least 300 psi or at least 350 psi or at least 400 psi, such as 75-450 psi or 75-400 psi and all subranges in between. At the same time, a surrounding pressure in the second pressure zone may be higher than a maximum operating pressure of the first zone. Such a surrounding pressure may be at least 75 psi or at least 100 psi or at least 125 psi or at least 150 psi or at least 175 psi or at least 200 psi or at least 250 psi or at least 300 psi or at least 350 psi or at least 400 psi or at least 450 psi or at least 500 psi or at least 550 psi or at least 600 psi, such as 75-650 psi or 200-650 psi or 400-650 psi and all the subranges in between. The enveloped arrangement may provide a number of advantages. For example, in the event of a leak from the first zone/loop circuit, the higher pressure in the surrounding second zone may cause the leaking component(s) to flow inwards the first zone, instead of outwards. Also, the surrounding higher pressure zone may reduce/prevent fatigue crack propagation over components of the first zone/loop circuit, including components made of plastic, such as manifolds and walls of reservoir. The pressurized envelope arrangement may also allow using thinner outer wall(s) for the sealed container/vessel, which can, nevertheless, prevent deformation(s) that could negatively impact internal flow geometries for the metal-halide electrolyte and the liquefied halogen reactant. In the absence of the pressurizing second zone, thicker outer wall(s) may be required to prevent such deformation(s) due to an unsupported structure against expansive force of the internal higher pressure.

In certain embodiments, the outer walls of the sealed container/vessel may be formed by a cylindrical component and two circular end plates, one of which may be placed on the top of the cylindrical component and the other on the bottom in order to seal the vessel. The use of the pressurized envelope arrangement for such outer walls allows using thinner end plates, without exposing internal flow geometries for the metal-halide electrolyte and the liquefied halogen reactant compared to the case when the outer walls are exposed to the variable pressure generated during the operation of the system.

The pressurizing second zone may be filled with an inert gas, such as argon or nitrogen. In some embodiments, the pressurizing second zone may also contain an additional component that can neutralize a reagent, such as the halogen reactant, that is leaking from the first zone, and/or to heal walls of the first zone/loop circuit. Such an additional material may be, for example, a soda ash. Thus, spaces 129, 130 and/131 may be filled with soda ash.

The electrochemical system in a pressurized envelope arrangement may be fabricated as follows. First, a sealed loop circuit for the metal halide electrolyte and the liquefied halogen reagent may be fabricated. The sealed loop circuit can be such that it is capable to maintain an inner pressure above a liquefication pressure of the liquefied halogen for a given temperature. The sealed loop circuit may include one or more of the following elements: one or more electrochemical cells, a reservoir for storing the metal-halide electrolyte and the liquefied halogen reactant; a feed manifold or pipe for delivering the metal-halide electrolyte and the liquefied halogen reactant from the reservoir to the one or more cells; a return manifold for delivering the metal-halide electrolyte and the liquefied halogen reactant from the one or more cells back to the reservoir; and one or more pumps. After the loop circuit is fabricated, it may be placed inside a vessel or container, which may be later pressurized to a pressure, which is higher than a maximum operation pressure for a loop circuit, and sealed. The pressurization of the vessel may be performed by pumping in an inert gas, such as argon or nitrogen, and optionally, one or more additional components. When the walls of the vessel are formed by a cylindrical component and two end plates, the sealing procedure may include the end plates at the top and the bottom of the cylindrical component.

Figure 2:
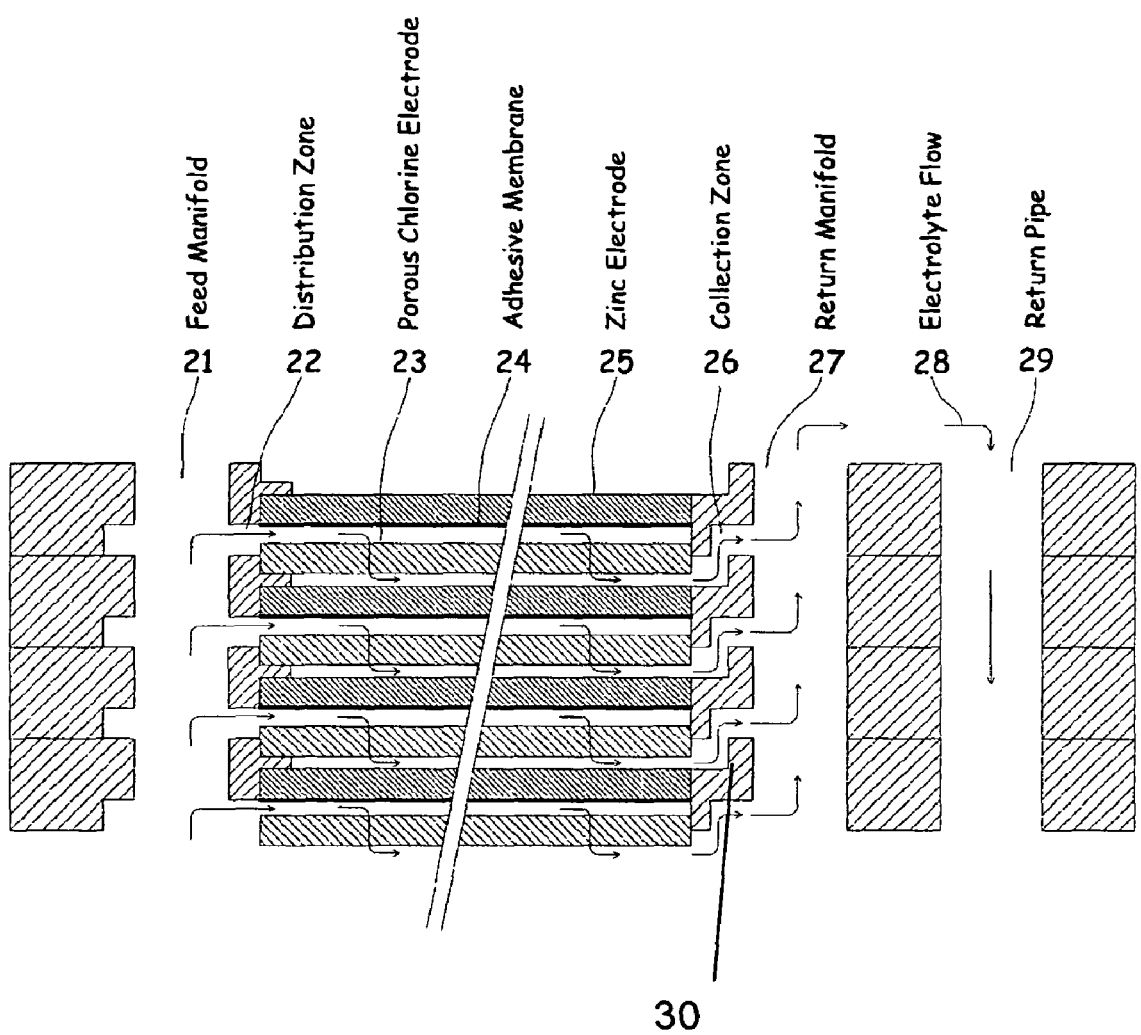
FIG. 2 illustrates a side cross section view of flow paths in a stack of horizontally positioned cells.

FIG. 2 illustrates paths for a flow of the metal-halide electrolyte and the liquefied halogen reactant through the horizontally positioned cells of the stack, such as the stack 103 of FIG. 1, in the discharge mode. The electrolyte flow paths in FIG. 2 are represented by arrows. For each of the cells in the stack, the flow may proceed from a feed pipe or manifold 21 (element 115 in FIG. 1), into a distribution zone 22, through a porous "chlorine" electrode 23, over a metal electrode 25, which may comprise a substrate, which may be, for example, a titanium substrate or a ruthenized titanium substrate, and an oxidizable metal, which may be, for example, zinc, on the substrate, to a collection zone 26, through an upward return manifold 27 (element 121 in FIG. 1), and to a return pipe 29 (element 122 in FIG. 1).

In some embodiments, an element 24 may be placed on a bottom of metal electrode 25. Yet in some other embodiments, such an element may be omitted. The purpose of the element 24 may be to prevent the flow of the metal-halide electrolyte from contacting the active metal electrode, when passing through a porous electrode of an adjacent cell located beneath. In some cases, the element 24 may comprise the polymer or plastic material.

FIG. 2 also shows barriers 30. Each barrier 30 may be a part of a cell frame discussed in a greater detail below. Barrier 30 may separate the positive electrode from the negative electrode of the same cell. Barriers 30 may comprise an electrically insulating material, which can be a polymeric material, such as poly vinyl chloride (PVC).

In the configuration depicted in FIG. 2, the metal-halide electrolyte may be forced to flow down through the porous electrode and then up to leave the cell. Such a down-and-up flow path may enable an electrical contact of the porous electrode and the metal electrode in each cell with a pool of the metal halide electrolyte remaining in each cell when the electrolyte flow stops and the feed manifold, distribution zone, collection zone, and return manifold drain. Such a contact may allow maintaining an electrical continuity in the stack of cells when the flow stops and may provide for an uninterrupted power supply (UPS) application without continuous pump operation. The down-and-up flow path within each cell may also interrupt shunt currents that otherwise would occur when electrolyte flow stops. The shunt currents are not desired because they may lead to undesirable self-discharge of the energy stored in the system and an adverse non-uniform distribution of one or more active materials, such as an oxidizable metal, such as Zn, throughout the stack.

Figure 5:
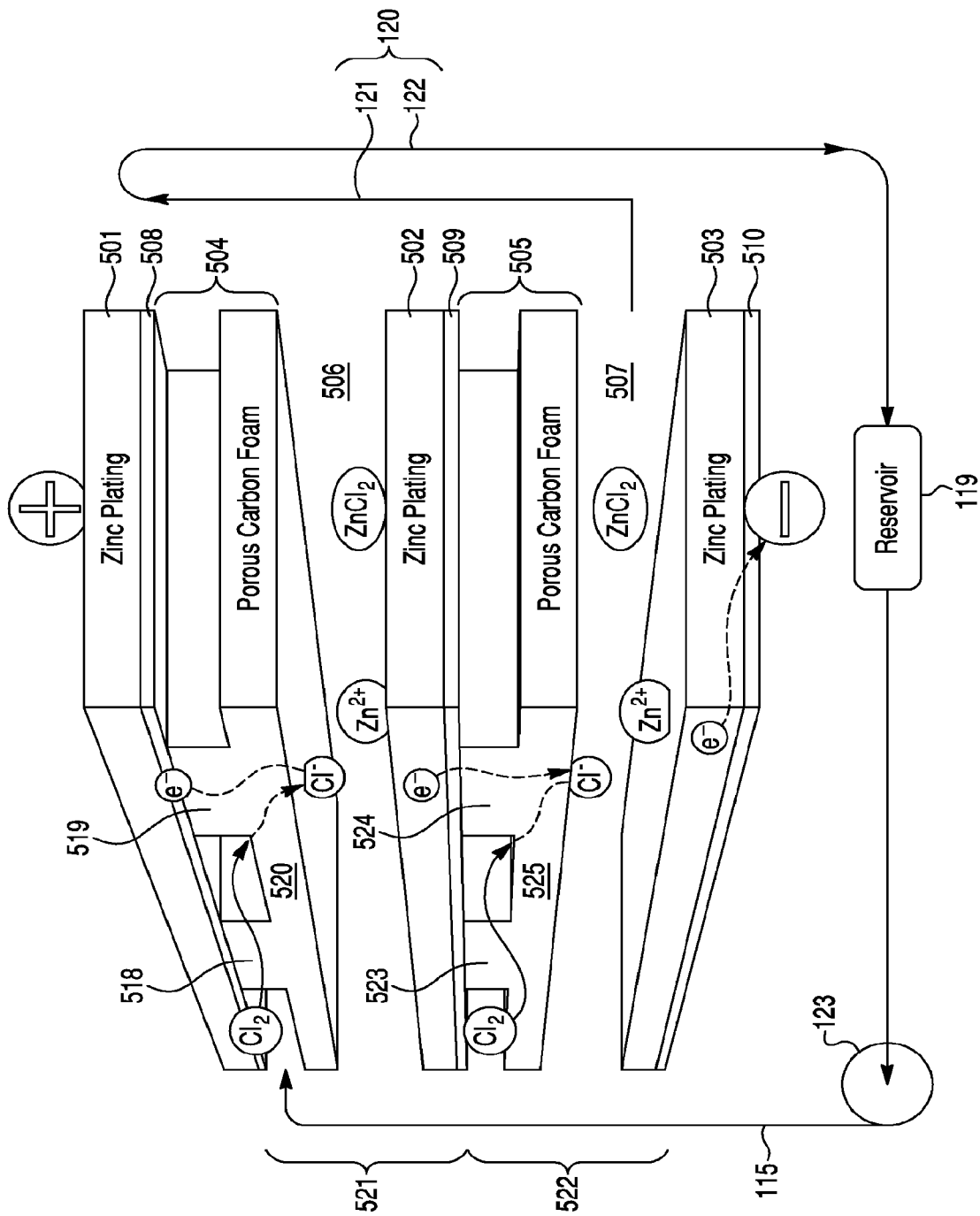
FIG. 5 schematically illustrates a three dimensional view of flow paths in the electrochemical energy generation system in a discharge mode.

FIG. 5 further illustrates flow paths through the stacked cells using $ZnCl_2$ as an exemplary metal-halide electrolyte and $Cl_2$ as an exemplary halogen reactant. The stack in FIG. 5 includes a cell 521, that has a reaction zone 506 between a positive electrode 504, e.g. porous carbon "chlorine" electrode, and a negative electrode 502, e.g. zinc electrode, and a cell 522, that has a reaction zone 507 between a positive electrode 505 and a negative electrode 503. The negative electrode 502 of the cell 522 is electrically connected to the positive electrode 505 of the cell 521, thereby providing electrical continuity between the cells of the stack. Each of the negative electrodes may comprise a conductive impermeable element, which is similar to the element 24 in FIG. 2. Such element is shown as element 509 for the electrode 502 and element 510 for the electrode 503. FIG. 5 also shows an electrode 501 or a terminal plate positioned over the positive electrode 504 of the cell 521. When the cell 521 is the top terminal cell, the electrode 501 can the terminal positive electrode of the stack. If the cell 521 is not the terminal cell, then the electrode 521 can be a negative electrode of an adjacent cell of the stack. The positive electrodes 504 and 505 are preferably porous electrodes, such as porous carbonaceous electrodes, such as carbon foam electrode. The cells may be arranged in the stack in such a manner that a cell to cell distance may be significantly greater that a distance between positive and negative electrodes of a particular cell of the stack (an interelectrode distance). The interelectrode distance may be, for example, 0.5-5 mm such as 1-2 mm. In some embodiments, the cell to cell distance may be at least 3 times or at least 5 times or at least 8 times or at least 10 times, such as 3-15 times greater, than the interelectrode distance. The cell to cell distance may be defined as between two analogous surfaces in two adjacent cell. For example, the cell to cell distance may be a distance between an upper surface of the negative electrode 502 of the cell 521 and an upper surface of the negative electrode 503 of the cell 522. The cell-to cell distance may be 5-20 mm, such as 10-15 mm. The distance between a particular cell's positive and negative electrodes in FIG. 5 is a distance between the lower surface of the positive electrode 504 of the cell 521 and the upper surface of the negative electrode 502 of the same cell. To achieve the significant difference between the cell to cell distance on one hand and the interelectrode distance in a particular cell at least one of positive or negative electrodes may comprise one or more electrically conductive spacers, which (i) increase the cell-to-cell distance compared to the interelectrode distance and (ii) provide a electrical contact between positive and negative electrodes of adjacent cells. In FIG. 5, the positive electrode 505 of the cell 522 has a porous part 525 and two conductive spacers 523 and 524, which are electrically connected to the negative electrode 502 of the adjacent cell 521. The conductive spacers 523 and 524 may or may not be made of a porous material. In certain embodiments, conductive spacers, such as spacers 523 and 524, may be made of carbonaceous material, such as graphite. Similarly to the electrode 505, the electrode 504 of the cell 521 contains a porous part 520 and two conductive spacers 518 and 519.

In addition to the cells 521 and 522, FIG. 5 shows a reservoir 119; a feed line 115, which includes a pump 123; and a return manifold 120, which includes an upper running part 121 and a part 122, which is connected with the reservoir 119. Together the reservoir 119, the feed line 115, the return manifold 120 and the reaction zones 506 and 507 form a closed loop (e.g. flow circle) for the metal halide electrolyte, which is illustrated as $ZnCl_2$ in FIG. 5, and the halogen reactant ($Cl_2$ in FIG. 5).

In the discharge mode, a mixture of the metal halide electrolyte and the liquefied halogen reactant arrives from the reservoir 119 at the top of a respective positive electrode of a cell, such as electrode 504 for cell 521 and the electrode 505 for the cell 522. The halogen reactant is reduced at the positive electrode. After the mixture penetrates through a porous part of the positive electrode (part 520 for the cell 521 and part 525 for the cell 522), it becomes enriched with halogen anions ($Cl^-$ in the case of molecular chlorine used as the halogen reactant). The reaction zone of the cell, such as zone 506 for the cell 521 or zone 507 for the cell 522, does not contain a membrane or a separator configured to separate halogen anions, such as $Cl^-$, from the metal halide electrolyte. Thus, from the positive electrode, the halogen anion enriched mixture proceeds down to the negative electrode, such as electrode 502 for the cell 521 and electrode 503 for the cell 522. In the discharge mode, a metal of the negative electrode is oxidized forming positive ions that are released into the halogen anion enriched mixture. For example, if the negative electrode comprises metallic Zn as shown in FIG. 5, the metallic zinc is oxidized into zinc ions, while releasing two electrons. The electrolyte mixture, which is enriched with both halogen anions and metal cations after contacting the negative electrode, leaves the cell through the upper running return manifold and goes back to the reservoir, where the mixture can be resupplied with a new dose of the liquefied halogen reactant. In sum, in the system illustrated in FIG. 5, the following chemical reactions can take place in the discharge mode:

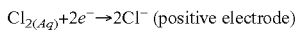

$Cl_{2(Aq)} + 2e^- \rightarrow 2Cl^-$ (positive electrode)

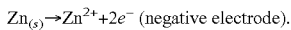

$Zn_{(s)} \rightarrow Zn^{2+} + 2e^-$ (negative electrode).

As the result of these reactions, 2.02 V per cell can be produced.

In the discharge mode, the electrochemical system can consume the halogen reactant and the metal constituting the negative electrode and produce an electrochemical potential. In the charge mode, the halogen reactant and the metal of the electrode may be replenished by applying a potential to the terminal electrodes of the stack. In the charge mode, the electrolyte from the reservoir moves in the direction opposite to the one of the discharge mode. For FIG. 5, such opposite movement means that the electrolyte moves counterclockwise. In the charge mode, the electrolyte enters the cell, such as cell 521 or 522, after passing through the return manifold 520, at the electrode, which acts as a negative electrode in the discharge mode but as a positive electrode in the charge mode. Such electrodes in FIG. 5 are the electrode 502 for the cell 521 and electrode 503 for the cell 522. At this electrode, the metal ions of the electrolyte may be reduced into elemental metal, which may be deposited back at the electrode. For example, for the system in FIG. 5, zinc ions may be reduced and deposited at the electrode 502 or 503 ($Zn^{2+} + 2e^- \rightarrow Zn$). The electrolyte then may pass through a porous electrode, such as electrodes 505 and 504 in FIG. 5, where halogen ions of the electrolyte may oxidize forming molecular halogen reactant. For the case illustrated in FIG. 5, chlorine ions of the metal-halide electrolyte oxidize at the electrodes 505 and 504 forming molecular chlorine. Because the system illustrated in FIG. 5 is placed under a pressure above the liquefication pressure for the halogen reactant, the halogen reactant, that is formed at the electrodes 505 and 504, is in liquid form. The electrolyte leaves the cell, such as cell 521 or 522, in a form of a mixture with the formed halogen reactant through the pipe or manifold 115. A concentration of the metal halide electrolyte in the mixture can be lower than a concentration of the electrolyte that entered the cell from the pipe 120. From the pipe 115, the mixture may enter the reservoir, where it can be separated into the halogen reactant and the metal electrolyte per se using, for example, gravity and an optional sump plate.

Figure 3:
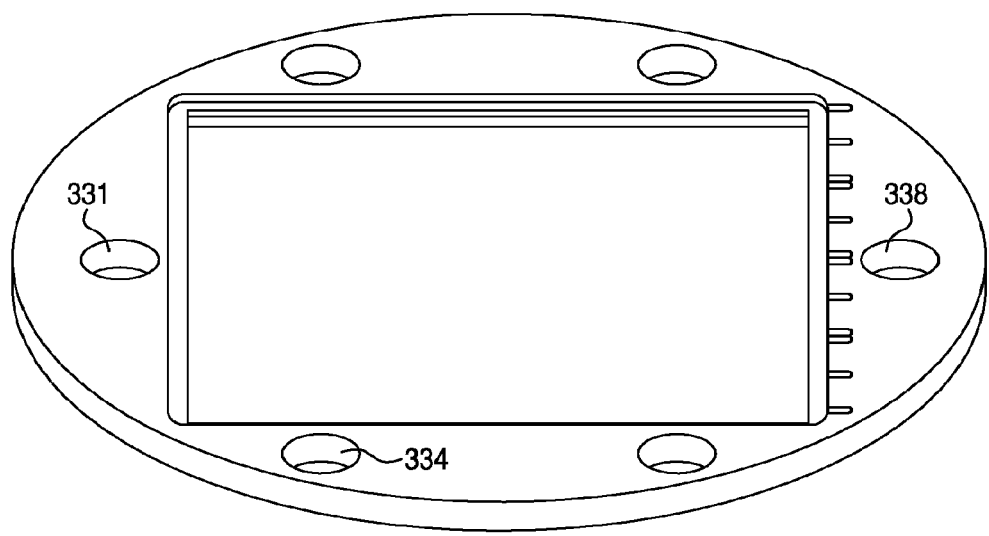
FIG. 3 illustrates a three dimensional view of cell frames that can be used in certain embodiments of the electrochemical energy generation system.
Figure 3:
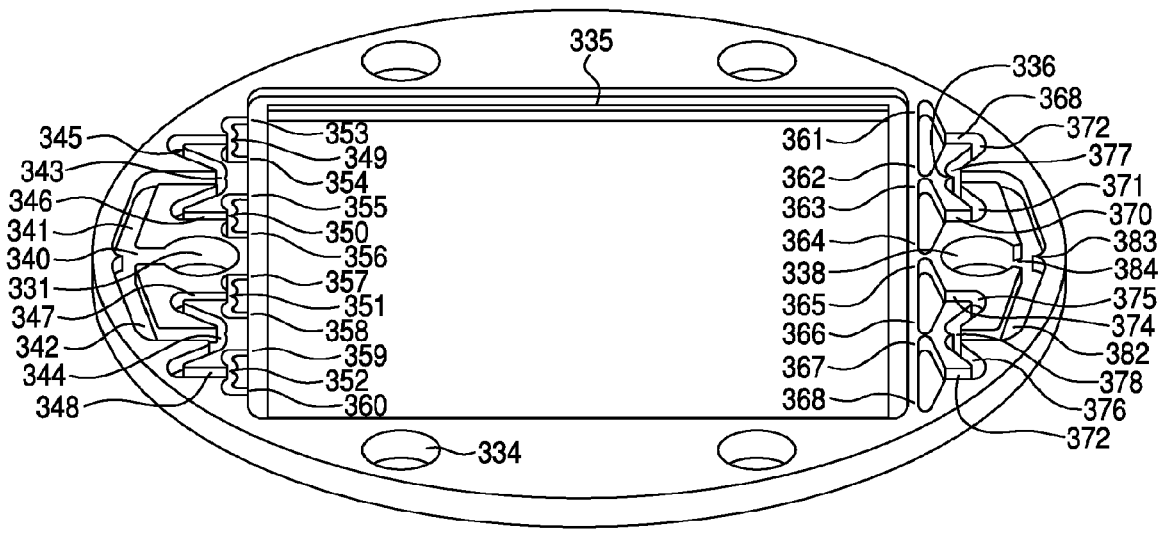

Before being delivered to the cells, the metal halide electrolyte mixed with the liquefied halogen reactant may undergo one or more flow splits, which may result in multiple flow paths to the porous electrode. These flow paths may have the same flow resistance. Each of the one or more splits may divide the flow into two. For example, FIG. 3 illustrates one possible cell design that has a first level splitting node 340, which splits the flow of the metal halide electrolyte and the liquefied halogen reactant, that is provided through the feed manifold 331, into subflows 341 and 342. Each of the subflows 341 and 342 may further split into two next level subflows at second level splitting nodes 343 and 344 respectively. Each of the four subflows 345, 346, 347, and 348, that are formed at the second level nodes, further split into two third level subflows at third level nodes 349, 350, 351 and 352 respectively. As the result of the three levels of splitting, the flow of the metal halide electrolyte and the liquefied halogen reactant may enter the cell through eight separate paths 353, 354, 355, 356, 357, 358, 359, 360, each of which has the same flow resistance because they have the same length and the same number of turns, which have the same radius, i.e. the same geometry. The flow splitting nodes may split the flow of the electrolyte and the halogen reactant for each cell of the stack.

The electrolyte and the liquefied halogen reactant may leave the cell through a multiple flow paths or through a single flow path. In some embodiments, the multiple flow paths may merge into a lesser number of flows before reaching the return manifold or pipe. For example, FIG. 3 shows that the electrolyte and the liquefied halogen reactant may leave the cell through eight flow paths 361-368. Adjacent flow paths 361 and 362, 363 and 364, 365 and 366, 367 and 368 merge at first level merging nodes 369-372 into second level flow paths 373, 374, 375 and 376 respectively. The second level flow paths further merge at four second level merging nodes 377 and 378 forming two third level flow paths 381 and 382, which further merge at a third level node 383, forming a single flow 384, which enters the return manifold 338. Each of the flow paths 361-368 have the same flow resistance as they have the same length and the same number of turns, which have the same radius, on its way to the return manifold.

FIG. 3 illustrates a electrochemical cell that comprises a cell frame. Such an electrochemical cell may be used to achieve the structures and flows shown in FIG. 2. The cell frame may include a feed manifold element 331, distribution channels, flow splitting nodes, spacer ledge 335, flow merging nodes, collection channels, return manifold element 338, and bypass conduit elements 334.

In some embodiments, plural cell frames, that are each identical or similar to the frame depicted in FIG. 3, may be stacked vertically with the electrodes in place, to form the stack shown in FIG. 2. To form such a stack, the feed manifold element, such as the element 331 in FIG. 3, in each of the plural cells frames may be aligned with the feed manifold element in another of the cell frames, thereby to form a feed manifold of the system. The distribution channels and the flow splitting nodes in each of the cell frames may be aligned with the distribution channels and the flow splitting nodes in another of the cell frames, thereby forming a distribution zone of the system. The positive electrode (discharge mode) of each of the cells sits above or below the negative electrode (discharge mode) for each cell on the spaces ledges of the cell frames, thereby forming alternating layers of positive electrodes and negative electrodes. The flow merging nodes and the collection channels in each of the plural cells frames may be aligned with the flow merging nodes and the collection channels in another of the cell frames, thereby forming a collection zone of the system. The return manifold element, such as the element 338 in FIG. 3, in each of the cell frames may be aligned with the return manifold element in another of the cell frames, thereby forming a return manifold of the system. The bypass conduit element, such as the element 334 in FIG. 3, in each of the cell frames may be aligned with the bypass conduit element in another of the cell frames, thereby forming a bypass conduit of the system. The bypass conduit may be used for fluid flow and/or electrical wires or cables.

In some embodiments, the cell frame may have a circular shape. Such a shape may facilitate insertion of the plural cells into a pressure containment vessel such, which has a cylindrical shape, thereby reducing a production cost for the system. The frames may comprise an electrically insulating material, which may be a polymer material, such as PVC.

The cell frame based design may facilitate a low-loss flow with uniform distribution for the electrolyte and the halogen reactant; a bipolar electrical design; an ease of manufacture, internal bypass paths, and elements by which the operational stasis mode (described below) may be achieved.

Advantages of the cell frame may include, but are not limited to, the flow-splitting design in the distribution zone that may include multiple order splits such as the first, second, and third order splits in the flow channels in FIG. 3, that result in multiple channels that each have the same flow resistance, because each of the channels has the same length and the number and radius of bends. FIG. 3 shows eight feed channels per cell that each have the same flow resistance. This design with multiple flow splits may allow maintenance of a laminar flow through each of the multiple channels. The design may allow equal division of flow volume between the multiple channels, independent of flow velocity, uniformity of viscosity, or uniformity of density in the electrolyte.

Modes of Operation

An Off Mode may be used for storage or transportation of the electrochemical energy generation system. During the Off Mode, the metal halide electrolyte and the halogen reactant are not delivered to the cell. A small amount of the halogen reactant, which may remain in the horizontally positioned, may be reduced and combined with metal ions to form metal halide. For example, the remaining liquefied chlorine reactant may be reduced into halogen anions and combined with zinc ions to form zinc chloride.

In the off mode, the terminal electrodes of the one or more cells of the system may be connected via a shorting resistor, yielding a potential of zero volts for the cells of the system. In some embodiments, a blocking diode preferably may be used to prevent reverse current flow through the system via any external voltage sources.

During the Discharge Mode the discharge pump may be on and the mixture of the metal halide electrolyte and the halogen reactant may be circulated through the cell(s) of the system. Electrons may be released as metal cations are formed from the oxidizable metal that constitutes the negative electrode. The released electrons may be captured by the halogen reactant, thereby reducing the reactant to halogen anions and creating an electrical potential on terminal electrodes of the cell(s) of the system. The demand for power from the system may consume the halogen reactant, causing a release of an additional dose of the liquefied halogen reactant from the reservoir into the feed pipe or manifold of the system.

During the Stasis or Standby Mode, there may be little or no flow of the metal halide electrolyte and the halogen reactant. The availability of the system may be maintained via a balancing voltage. This balancing voltage may prevent a self-discharge of the system by maintaining a precise electrical potential on the cell(s) of the system to counteract the electrochemical reaction forces that can arise when there is no circulation of the metal halide electrolyte and the halogen reactant.

The particular design of the cell plates disclosed may interrupt shunt currents that would otherwise flow through the feed and return manifolds, while maintaining cell-to-cell electrical continuity.

Although the foregoing refers to particular preferred embodiments, it will be understood that the present invention is not so limited. It will occur to those of ordinary skill in the art that various modifications may be made to the disclosed embodiments and that such modifications are intended to be within the scope of the present invention. All of the publications, patent applications and patents cited in this specification are incorporated herein by reference in their entirety.

What is claimed is:

1. A flow battery system, comprising:
   a stack of flow battery cells, wherein each cell in the stack of cells comprises:
   a first porous electrode;
   a second non-porous electrode;
   a reaction zone between the first and second electrodes; and
   a metal halide electrolyte; and
   an electrolyte storage reservoir;
   a flow circuit configured to deliver the metal halide electrolyte to the stack of cells, wherein the flow circuit comprises a feed manifold configured to deliver the electrolyte from the reservoir to the stack of cells and a return manifold configured to deliver the electrolyte from the stack of cells to the reservoir;
   a circulation pump which is configured to convey the electrolyte from the reservoir to the stack of cells through the flow circuit; and
   a plurality of conductive spacers which electrically connect the first porous electrode of each cell to the second non-porous electrode of an adjacent cell in the stack of cells;
   wherein an inlet or outlet for the electrolyte for each cell in the stack of cells is located between the conductive spacers on a first side of the first porous electrode and another one of an outlet or an inlet for the electrolyte for each cell in the stack is located in the reaction zone on a second side of the first porous electrode.

2. The system of claim 1, wherein the first porous electrode comprises a positive electrode, the second non-porous electrode comprises a negative electrode, and the electrolyte comprises an aqueous zinc halide electrolyte.

3. The system of claim 2, wherein the negative electrode comprises zinc.

4. The system of claim 1, wherein the reservoir is located below the stack of cells in the vessel.

5. The system of claim 1, wherein the reservoir contains at least one partition.

6. The system of claim 1, wherein the reaction zone of each cell in the stack does not contain a membrane or a separator that is impermeable or semipermeable to the halogen.

7. The system of claim 1, wherein the system does not comprise a compressor.

8. The system of claim 1, wherein the stack comprises a vertical stack of horizontal cells connected in series.

* * * * *